United States Patent
Huang et al.

(10) Patent No.: US 10,477,141 B1
(45) Date of Patent: Nov. 12, 2019

(54) FRAME SYNCHRONOUS PACKET SWITCHING FOR HIGH-DEFINITION MULTIMEDIA INTERFACE (HDMI) VIDEO TRANSITIONS

(71) Applicant: Futurewei Technologies, Inc., Plano, TX (US)

(72) Inventors: Jiong Huang, San Jose, CA (US); Laurence A. Thompson, Morgan Hill, CA (US); Le Yuan, Shenzhen (CN); Hua Long, Shenzhen (CN); Yong Su, Shenzhen (CN); Zhigui Wei, Shenzhen (CN); Feng Wang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/982,838

(22) Filed: May 17, 2018

(51) Int. Cl.
| | |
|---|---|
| *H04N 5/57* | (2006.01) |
| *H04N 7/088* | (2006.01) |
| *H04N 7/015* | (2006.01) |
| *H04N 19/46* | (2014.01) |
| *H04L 12/931* | (2013.01) |

(52) U.S. Cl.
CPC .......... *H04N 7/0881* (2013.01); *H04N 7/015* (2013.01); *H04N 7/0884* (2013.01); *H04N 19/46* (2014.11); *H04L 49/35* (2013.01)

(58) Field of Classification Search
CPC .... H04N 7/0881; H04N 7/0884; H04N 19/46; H04N 7/015; H04N 1/646; H04L 49/35; G06T 9/004; G06T 5/009
See application file for complete search history.

(56) References Cited

U.S. PATENT DOCUMENTS

| | | | |
|---|---|---|---|
| 2006/0153179 A1* | 7/2006 | Ho | H04L 12/5601 370/386 |
| 2016/0156823 A1* | 6/2016 | Yoshida | H04N 5/772 348/143 |
| 2017/0019705 A1* | 1/2017 | Rozendaal | H04N 5/765 |
| 2017/0251161 A1 | 8/2017 | Toma et al. | |
| 2019/0172423 A1* | 6/2019 | Kurokawa | G09G 5/00 |

OTHER PUBLICATIONS

"A DTV Profile for Uncompressed High Speed Digital Interfaces", CTA Standard CTA-861-G, Consumer Technology Association, (Nov. 2016), 215 pgs.

* cited by examiner

*Primary Examiner* — Howard D Brown, Jr.
(74) *Attorney, Agent, or Firm* — Schwegman Lundberg & Woessner, P.A.

(57) ABSTRACT

An apparatus for use in a high-definition media interface (HDMI) source device includes an HDMI interface for transmitting video data and metadata to a sink device. The apparatus is configured to encode the metadata in an auxiliary video information (AVI) information frame (InfoFrame). The apparatus is further configured to transmit the AVI InfoFrame during a frame synchronous transmission window (FSTW) of the video data, wherein the FSTW begins during a video blanking interval (VBI) of the video data, on a first video blank pixel that immediately follows a last active video pixel of a preceding video frame or video field and ends a predetermined number of video lines after a start of the VBI.

20 Claims, 8 Drawing Sheets

FRAME SYNCHRONOUS PACKET SWITCHING FOR HIGH-DEFINITION MULTIMEDIA INTERFACE (HDMI) VIDEO TRANSITIONS

TECHNICAL FIELD

This application concerns sending and receiving units that employ a high-definition multimedia interface (HDMI) and in particular to HDMI sending and receiving units implementing frame synchronous transitions among high dynamic range (HDR) and standard dynamic range (SDR) video content.

BACKGROUND

The high-definition multimedia interface (HDMI) is a popular interface for transmitting high-speed baseband digital video and associated audio signals for presentation on an HDMI-capable device. Recently, high dynamic range (HDR) video display devices have become available, and video sources, such as digital versatile disc (DVD) players, television broadcasts, and on-line streaming services, now provide HDR content. HDR displays that receive HDR content provide higher brightness levels and may also provide darker black levels and improved color rendering as compared to standard dynamic range (SDR). SDR video refers to a dynamic range of between zero and 300 nits ($cd/m^2$). Recently, display devices having dynamic ranges up to 10000 nits or greater have become available. These display devices are referred to as HDR displays. In order to accommodate these HDR displays and the corresponding HDR sources, video interfaces, including HDMI, have been adapted to transport both pixel data and SDR or HDR metadata over the interface.

Metadata for SDR video data is sent over the HDMI interface using auxiliary video information (AVI) information frames (InfoFrames). Currently, there are two types of HDR metadata, static HDR (S-HDR) metadata which is sent using DRange and Mastering (DRAM) InfoFrames, and dynamic HDR metadata which is sent using HDR Dynamic Metadata Extended (HDR DME) InfoFrames. S-HDR metadata is applied to an entire program while dynamic HDR metadata may change more frequently, typically over a sequence of several frames but could change frame to frame. The metadata in the DRAM InfoFrames and HDR DME InfoFrames augments the metadata in the AVI InfoFrames.

A source processing an HDR signal may be coupled to a sink (e.g., display) configured to display only SDR video or SDR video and one or both of S-HDR video or dynamic HDR video. When the sink does not support dynamic HDR, the source may convert the dynamic HDR video data to S-HDR video data or SDR video data before sending the video data to the sink. When the sink does not support S-HDR video or dynamic HDR video, the source may convert both S-HDR video data and dynamic HDR video data to SDR video data before sending the video data to the sink. A sink that is capable of displaying dynamic HDR video receives the video data over the HDMI interface using the HDR DME InfoFrame in a frame-synchronous manner so that the metadata is applied to the frame occurring immediately after the metadata is received.

To implement the frame-synchronous switching of the dynamic HDR metadata carried in the HDR DME InfoFrame, HDMI 2.1 defines a frame accurate packet area (FAPA) in the vertical blanking area of the video signal and specifies that HDR DME InfoFrames are to be sent during the FAPA period. HDMI 2.1 also specifies that AVI InfoFrames and DRAM InfoFrames are to be sent in a frame-synchronous manner, but HDMI 2.1 does not require that these InfoFrames be sent during any particular period within a video frame. Therefore, considering the timing requirements specified for transmission of InfoFrames, the timing of the HDR DME InfoFrame, is precisely specified to be transmitted during the FAPA period. The AVI InfoFrame and the DRAM InfoFrame are required to be frame-synchronous, but a specific time period for transmission is not specified.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, an apparatus for use in a source device for transmitting and receiving data using a high definition media interface (HDMI), the apparatus comprises an HDMI interface for transmitting data to and receiving data from a sink device; a memory holding executable code; a processor, coupled to the memory and to the HDMI interface, the processor configured by the executable code to: receive video data and metadata for transmission to the sink device; encode the metadata in an auxiliary video information (AVI) information frame (InfoFrame); and transmit the AVI InfoFrame during a frame synchronous transmission window (FSTW) of the video data, wherein the FSTW begins during a video blanking interval (VBI) of the video data, on a first video blank pixel that immediately follows a last active video pixel of a preceding video frame or video field and ends a predetermined number of video lines after a start of the VBI.

Optionally, in the preceding aspect, a further implementation of the aspect includes, the received video data including standard dynamic range (SDR) video data and the metadata is metadata for the SDR video data.

Optionally, in any of the preceding aspects, a further implementation of the aspect includes, the received metadata including metadata for a static high dynamic range (S-HDR) video sequence wherein the processor is configured by the executable code to: encode the metadata for the S-HDR video sequence in the AVI InfoFrame and in a DRange and Mastering (DRAM) InfoFrame; and transmit the AVI InfoFrame and the DRAM InfoFrame during the FSTW.

Optionally, in any of the preceding aspects, a further implementation of the aspect includes, the received metadata including metadata for a dynamic high dynamic range (HDR) video sequence wherein the processor is configured by the executable code to: encode the metadata for the dynamic HDR video sequence in the AVI InfoFrame and in a HDR dynamic metadata extended (HDR DME) InfoFrame; and transmit the AVI InfoFrame and the HDR DME InfoFrame during the FSTW.

According to another aspect of the present disclosure, an apparatus for use in a sink device for receiving data using a high definition media interface (HDMI), the apparatus comprises: an HDMI interface for receiving data from a source device; a memory holding executable code; a processor, coupled to the memory and to the HDMI interface, the processor configured by the executable code to: receive a video sequence from the source device, the video sequence including a plurality of video fields or video frames, each video field or video frame including an active video interval and a vertical blanking interval (VBI); extract an auxiliary video information (AVI) information frame (InfoFrame) including metadata for the video sequence from a frame synchronous transmission window (FSTW) of the VBI of at least one of the fields or frames of the video sequence, wherein the FSTW begins during the VBI on a first video blank pixel that immediately follows a last active video pixel of a preceding video field or video frame and ends a predetermined number of video lines after a start of the VBI; extract the metadata from the AVI InfoFrame; and apply the extracted metadata to video data in the active video interval of the video field or video frame containing the FSTW.

Optionally, in any of the preceding aspects, a further implementation of the aspect includes the received video sequence having a static high dynamic range (S-HDR) video sequence wherein the processor is configured by the executable code to: extract a DRange and Mastering (DRAM) InfoFrame from the FSTW of the VBI of the at least one field or frame of the video sequence; extract further metadata from the DRAM InfoFrame; and apply the extracted metadata and the further metadata to the video data in the active video interval of the video field or video frame containing the FSTW.

Optionally, in any of the preceding aspects, a further implementation of the aspect includes the received video sequence having a high dynamic range (HDR) video sequence wherein the processor is configured by the executable code to: extract an HDR dynamic metadata extended (HDR DME) InfoFrame from the FSTW of the VBI of the at least one field or frame of the video sequence; extract further metadata from the HDR DME InfoFrame; and apply the extracted metadata and the further metadata to the video data in the active video interval of the video field or video frame containing the FSTW.

According to another aspect of the present disclosure, a method for transmitting data from a source device to a sink device uses a high definition media interface (HDMI) and comprises: receiving video data and metadata for transmission to the sink device; encoding the metadata in an auxiliary video information (AVI) InfoFrame; and transmitting the AVI InfoFrame during a frame synchronous transmission window (FSTW) of the video data, wherein the FSTW begins during a video blanking interval (VBI) of the video data, on a first video blank pixel that immediately follows a last active video pixel of a preceding video frame or video field and ends a predetermined number of video lines after a start of the VBI.

Optionally, in any of the preceding aspects, a further implementation of the aspect includes receiving standard dynamic range (SDR) video data and the metadata is metadata for the SDR video data.

Optionally, in any of the preceding aspects, in a further implementation of the aspect, receiving the video data and metadata includes receiving a static high dynamic range (S-HDR) video sequence and metadata for the S-HDR video sequence; encoding the metadata includes encoding the metadata for the S-HDR video sequence in the AVI InfoFrame and in a DRange and Mastering (DRAM) InfoFrame; and transmitting the AVI InfoFrame includes transmitting the AVI InfoFrame and the DRAM InfoFrame during the FSTW.

Optionally, in any of the preceding aspects, in a further implementation of the aspect, receiving the video data and metadata includes receiving a dynamic high dynamic range (HDR) video sequence and metadata for the dynamic HDR video sequence; encoding the metadata includes encoding the metadata for the dynamic HDR video sequence in the AVI InfoFrame and in a HDR dynamic metadata extended (HDR DME) InfoFrame; and transmitting the AVI InfoFrame includes transmitting the AVI InfoFrame and the HDR DME InfoFrame during the FSTW.

Optionally, in any of the preceding aspects, a further implementation of the aspect includes receiving a video sequence from the source device, the video sequence including a plurality of video fields or video frames, each video field or video frame including an active video interval and a vertical blanking interval (VBI); extracting an auxiliary video information (AVI) information frame (InfoFrame) including metadata for the video sequence from a frame synchronous transmission window (FSTW) of the VBI of at least one of the fields or frames of the video sequence, wherein the FSTW begins during the VBI on a first video blank pixel that immediately follows a last active video pixel of a preceding video field or video frame and ends a predetermined number of video lines after a start of the VBI; extracting the metadata from the AVI InfoFrame; and applying the extracted metadata to video data in the active video interval of the video field or video frame containing the FSTW.

Optionally, in any of the preceding aspects, a further implementation of the aspect includes extracting a DRange and Mastering (DRAM) InfoFrame from the FSTW of the VBI of the at least one field or frame of the video sequence; extracting further metadata from the DRAM InfoFrame; and applying the further metadata to the S-HDR video data in the active video interval of the video field or video frame containing the FSTW.

Optionally, in any of the preceding aspects, a further implementation of the aspect includes extracting an HDR dynamic metadata extended (HDR DME) InfoFrame from the FSTW of the VBI of the at least one field or frame of the video sequence; extracting further metadata from the HDR DME InfoFrame; and applying the further metadata to the dynamic HDR video data in the active video interval of the video field or video frame containing the FSTW.

According to another aspect of the present disclosure, a computer-readable medium includes program instructions for execution by a processor to configure the processor to transmit data from a source device to a sink device using a high definition media interface (HDMI), the program instructions configuring the processor to: receive video data and metadata for transmission to the sink device; encode the metadata in an auxiliary video information (AVI) information frame (Info Frame); and configure the AVI InfoFrame for transmission during a frame synchronous transmission window (FSTW) of the video data, wherein the FSTW begins during a video blanking interval (VBI) of the video data, on a first video blank pixel that immediately follows a last active video pixel of a preceding video frame or video field and ends a predetermined number of video lines after a start of the VBI.

Optionally, in any of the preceding aspects, a further implementation of the aspect includes program instructions to configure the processor to: receive standard dynamic range (SDR) video data and metadata for the SDR video data; and encode the metadata for the SDR video data in the AVI InfoFrame.

Optionally, in any of the preceding aspects, a further implementation of the aspect includes program instructions to configure the processor to: receive, as the video data and metadata, a static high dynamic range (S-HDR) video sequence and metadata for the S-HDR video sequence; encode the metadata for the S-HDR video sequence in the AVI InfoFrame and in a DRange and Mastering (DRAM) InfoFrame; and configure the AVI InfoFrame and the DRAM InfoFrame for transmission during the FSTW.

Optionally, in any of the preceding aspects, a further implementation of the aspect includes program instructions to configure the processor to: receive, as the video data and metadata, a dynamic high dynamic range (HDR) video sequence and metadata for the dynamic HDR video sequence; encode the metadata for the dynamic HDR video sequence in the AVI InfoFrame and in a HDR dynamic metadata extended (HDR DME) InfoFrame; and configure the AVI InfoFrame and the HDR DME InfoFrame for transmission during the FSTW.

According to yet another aspect of the present disclosure, a computer-readable medium includes program instructions for execution by a processor to configure the processor in a sink device to receive data from a source device using a high definition media interface (HDMI), the program instructions configuring the processor to: receive a video sequence from the source device, the video sequence including a plurality of video fields or video frames, each video field or video frame including an active video interval and a vertical blanking interval (VBI); extract an auxiliary video information (AVI) information frame (InfoFrame) including metadata for the video sequence from a frame synchronous transmission window (FSTW) of the VBI of at least one of the fields or frames of the video sequence, wherein the FSTW begins during the VBI on a first video blank pixel that immediately follows a last active video pixel of a preceding video field or video frame and ends a predetermined number of video lines after a start of the VBI; extract the metadata from the AVI InfoFrame; and apply the extracted metadata to video data in the active video interval of the video field or video frame containing the FSTW.

Optionally, in any of the preceding aspects, a further implementation of the aspect includes program instructions to configure the processor to: receive, as the video sequence, a static high dynamic range (S-HDR) video sequence and the method further comprises: extracting a DRange and Mastering (DRAM) InfoFrame from the FSTW of the VBI of the at least one field or frame of the video sequence; extracting further metadata from the DRAM InfoFrame; and applying the further metadata to the video data in the active video interval of the video field or video frame containing the FSTW.

DETAILED DESCRIPTION

Figure 1A:
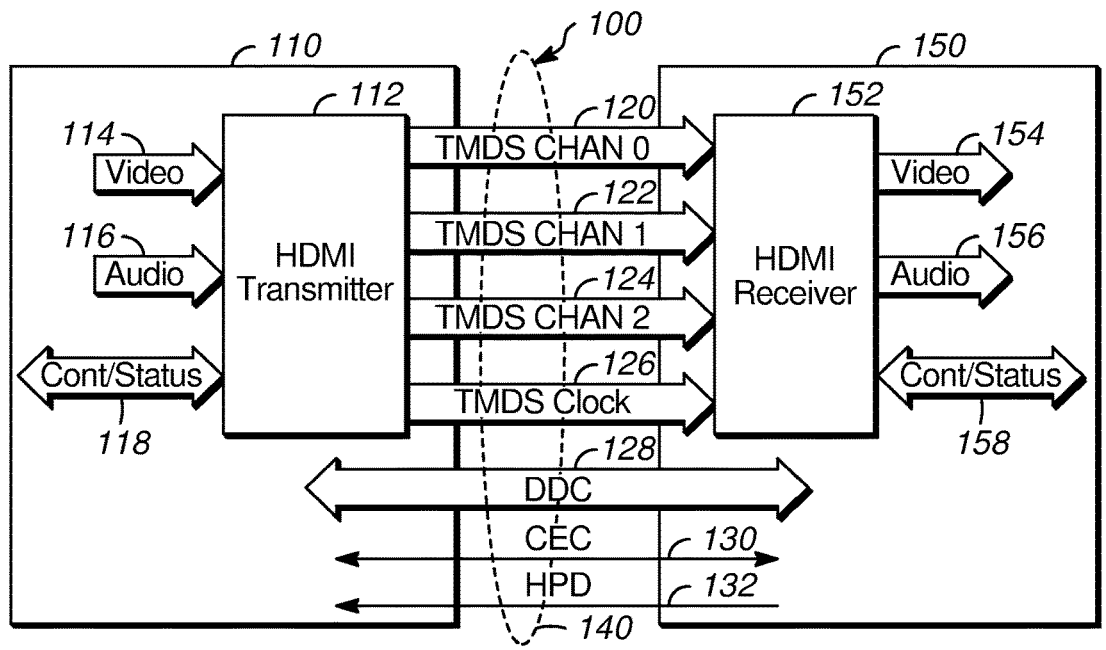
FIG. 1A is a block diagram of an HDMI sending unit and receiving unit including transition minimized differential signaling (TMDS) lanes channels according to an example embodiment.

In the following description, reference is made to the accompanying drawings that form a part hereof, and in which is shown by way of illustration specific embodiments which may be practiced. These embodiments are described in sufficient detail to enable those skilled in the art to practice the subject matter, and it is to be understood that other embodiments may be utilized and that structural, logical, and electrical changes may be made without departing from the scope of the present subject matter. The following description of example embodiments is, therefore, not to be taken in a limited sense, and the scope of the present subject matter is defined by the appended claims.

The functions or algorithms described herein may be implemented in software in one embodiment. The software may consist of computer-executable instructions stored on computer-readable media or computer-readable storage device such as one or more non-transitory memories or other type of hardware based storage devices, either local or networked. Further, such functions correspond to modules, which may be software, hardware, firmware, or any combination thereof. Multiple functions may be performed in one or more modules as desired, and the embodiments described are merely examples. The software may be executed on processing circuitry that may include a single core microprocessor, multi-core microprocessor, digital signal processor, application specific integrated circuit (ASIC), field programmable gate array (FPGA), or other type of data processing circuitry operating on a computer system, such as a personal computer, server or other computer system, turning such computer system into a specifically programmed machine.

In many existing systems, video information originates from a single source such as a digital versatile disk (DVD) player or a television tuner. These sources typically provide video data with a uniform dynamic range and may provide either SDR data or S-HDR data. To display video data from these sources, the HDMI interface provides for S-HDR metadata signaling (e.g., AVI InfoFrames and DRAM InfoFrames) and SDR signaling (e.g., AVI InfoFrames).

S-HDR signaling works well when the video data changes between HDR and SDR infrequently (e.g., when an S-HDR disk is inserted in the DVD player). Increasingly, however, video data is provided in a streaming format in which disparate video segments are stitched together into a single stream. Some segments may be SDR segments while others are HDR segments. As described below with reference to FIG. 6, there may be a relatively short period after the switch between displaying the S-HDR and SDR signals in which the display device produces a slightly distorted image. This distortion occurs, for example, on switching between television programs when SDR signals are processed using metadata intended for displaying S-HDR signals or vice versa. Because this distortion is relatively minor, infrequent, and short in duration, it has generally been ignored.

More recently, different types of HDR video data may be provided in a single scene or for a single frame. For example, in a relatively dark scene, the range of luminance values may be significantly less than the full range of the HDR signal. For example, a 10-bit luminance signal may have values bounded by 0-255, the range of an 8-bit video signal. In this instance, an opto-electric transfer function (OETF) and corresponding electro-optical transfer function (EOTF) may be applied so that the image data in the scene may be mapped into the 10-bit range of the luminance signal, reducing quantization distortion in the reproduced image. These signals are dynamic HDR signals that may use HDR DME InfoFrames to send the EOTF to the sink device.

Because the dynamic HDR video signals having HDR DME may change on a frame-by-frame basis, the HDR DME InfoFrames are processed with frame-synchronous timing to ensure proper display of the HDR video data. The embodiments described below also send AVI InfoFrames and DRAM InfoFrames in a frame-synchronous transmission window (FSTW). The FSTW, which has the same timing as FAPA with location start 0 (FAPA0), starts on the first video blank pixel that immediately follows the last active video pixel of a video frame/field and ends FAPA_end lines prior to the start of the next active region (as described in section 10.10.1.1 of the High-Definition Multimedia Interface Specification Version 2.1). Briefly, FAPA_end may be one-half the number of lines in the VBI or less, depending on the number of lines in the VBI. The FSTW is used by sink devices compatible with dynamic HDR video and has timing that corresponds to the FAPA. Sending the AVI InfoFrames and DRAM InfoFrames as well as HDR DME InfoFrames during the FSTW reduces image distortion that may occur on switching among SDR, S-HDR and dynamic HDR video formats. As used herein, FSTW is identical to FAPA0.

FIG. 1A is a block diagram of an HDMI system 100 having a sending unit 110 and receiving unit 150 and including transition-minimized differential signaling (TMDS) channels according to an example embodiment. In the system 100, and HDMI sending unit 110 is coupled to an HDMI receiving unit 150 by an HDMI cable 140. The HDMI sending unit 110 is a component of an HDMI source device (not shown in FIG. 1A) and the HDMI receiving unit 150 is a component of an HDMI sink device (not shown in FIG. 1A). The sending unit 110 includes an HDMI transmitter 112 that receives video data 114, audio data 116, and control and status data 118. The HDMI cable 140 connecting the HDMI sending unit 110 and receiving unit 150 includes three TMDS channels 120, 122, and 124; a TMDS clock channel 126; a display data channel (DDC) 128, a consumer electronics control (CEC) channel 130; and a hot plug detect (HPD) channel 132. The HDMI receiving unit 150 includes an HDMI receiver 152 that receives differentially encoded data via the TMDS channels 120, 122, and 124 at times determined by the TMDS clock channel 126 and decodes the received data to provide video data 154, audio data 156, and control/status data 158.

The TMDS channels 120, 122, and 124 allow the source device to transmit video and audio data 154, 156 to the sink device at rates up to 6 gigabits per second (Gbps) using differential signals synchronized by the clock signal transmitted through the TMDS clock channel 126. The audio data 156 may be encoded in data islands, described below, that are transmitted in the vertical and horizontal blanking intervals of the transmitted video data 154.

The DDC 128 is a serial channel that includes a serial data (SDA) conductor (not separately shown) and a serial clock (SCL) conductor (not separately shown). The DDC 128 is used to send/receive control data between the sending unit 110 and the receiving unit 150. For example, the sending unit 110 may use the DDC 128 to read enhanced extended display identification data (E-EDID), such as a vendor-specific data block (VSDB) from the receiving unit 150. For this operation, the receiving unit 150 may include a read only memory (ROM) (not shown) that stores the E-EDID of the HDMI receiving unit 150.

The sending unit 110 uses the HPD line to sense that the sink device is coupled to the cable 140 and is powered on. Responsive to the HPD line having a positive DC bias potential, the sending unit 110 reads the E-EDID data via the DDC 128 to determine the capabilities of the receiving unit 150. The CEC channel 130 allows users to control devices connected by the HDMI cable 140 using a single remote control device (not shown). As described below, the E-EDID may include information about the HDR capabilities of the sink device, for example, whether the sink device supports S-HDR and/or dynamic HDR.

Figure 1B:
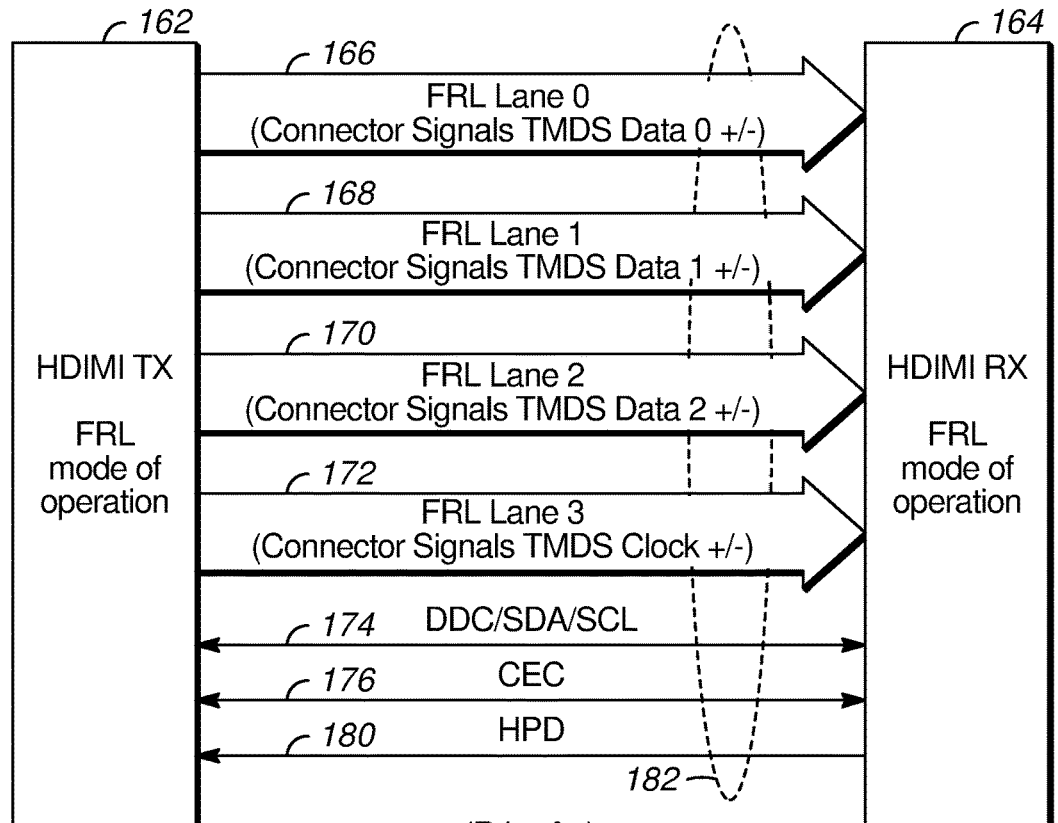
FIG. 1B is a block diagram of an HDMI sending unit and receiving unit including fixed rate link (FRL) lanes according to an example embodiment.

FIG. 1B is a block diagram of an HDMI sending unit 162 and receiving unit 164 connected by an HDMI cable 182 including fixed rate link (FRL) lanes (channels) 166, 168, 170, and 172 according to an example embodiment. This embodiment differs from the embodiment shown in FIG. 1A in that the three TMDS channels 120, 122, and 124 have been replaced by three fixed rate link (FRL) lanes 166, 168 and 170. In addition, the TMDS clock channel 126 has been replaced by a fourth FRL lane 172. The FRL lanes employ 16b 18b encoding, and each lane can support data rates up to 12 Gbps, providing a bandwidth of up to 48 Gbps when all four lanes are used. The clock signal is encoded in the FRL data, so a separate clock channel is not needed. The HDMI system is backwards compatible, so the FRL lanes 166, 168, 170, and 172 can support three TMDS data channels and a TMDS clock channel as shown in FIG. 1A. The remaining components of the cable 182—the DDC/SDA/SCL channel 174, CEC 176, and HPD channel 180—operate in the same way as the corresponding channels 128, 130, and 132 shown in FIG. 1A.

Figure 2:
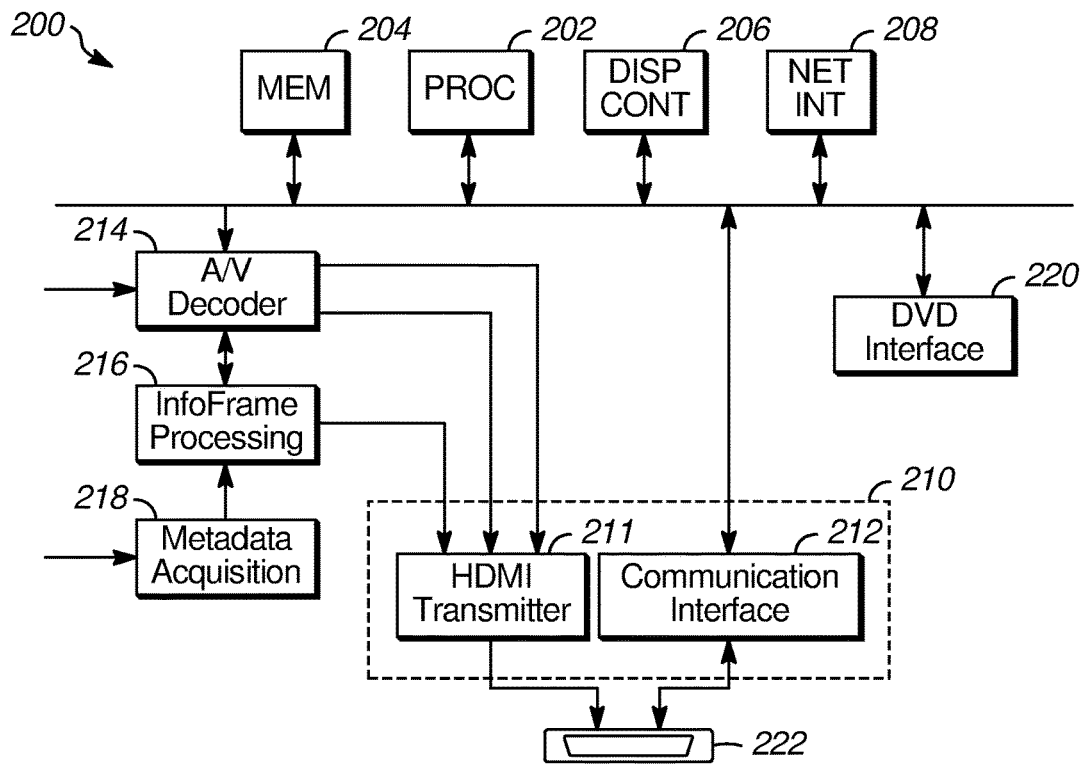
FIG. 2 is a block diagram of an HDMI source device according to an example embodiment.

FIG. 2 is a block diagram of an example HDMI source device 200 according to an example embodiment. The example HDMI source device 200 is able to provide SDR, S-HDR, and dynamic HDR video sequences and corresponding metadata to a compatible sink device 300 for frame synchronous processing. In addition to the HDMI sending unit 210 and HDMI connector 222, the source device 200 includes a processor 202, a memory 204, a display controller 206, a network interface 208, a DVD interface 220, an audio video decoder 214, InfoFrame processing circuitry 216, and metadata acquisition circuitry 218. The HDMI sending unit 210 includes an HDMI transmitter 211 and a communication interface 212. The example source device 200 may be a DVD player having a network interface coupled to receive streaming video data. The device 200 may also receive compressed audio and video data at an input to the audio video decoder 214 and metadata via the metadata acquisition circuitry 218.

The processor 202 controls the operation of other components of the HDMI source device 200. The memory 204 holds data and instructions for the processor 202. The processor 202 may operate the display controller 206 to control a display panel (not shown) used to control the operation of the HDMI source device 200. The display controller 206 may also interface with an input device such as a touchscreen and/or keypad (not shown) to allow a user to input data for controlling the HDMI source device 200. The processor 202 may also control the network interface 208 to allow the source device 200 to access media content from a network (e.g., the Internet) via a browser or a video streaming application. As described above, this media content may be streaming video including SDR segments, S-HDR segments, and/or dynamic HDR segments. The communication interface 212 of the HDMI sending unit 210 is controlled by the processor 202 to communicate with the sink device (described below with reference to FIG. 3) via the DDC/SDA/SCL channel 174 of the HDMI interface. shown in FIG. 1B. The processor 202 uses this interface to send commands and data to, and to receive commands and data from, the sink device via the communication interface 212. For example, the source device 200 may use the communication interface 212 to read the E-EDID of the sink device to determine whether the sink device is able to process dynamic HDR video data.

In the example source device 200, compressed video and audio data from the DVD interface 220 and/or the network interface 208 are provided to the audio video decoder 214. The decoder 214 may include a motion picture experts group (MPEG) decoder such as an H.222/H.262 (MPEG2), H.264 advanced video coding (AVC), and/or H.265 high efficiency video coding (HEVC) decoder. The decoder 214 generates baseband video and audio data from the encoded data provided by the network interface 208, DVD interface 220, or provided directly to the AV decoder 214 as indicated in FIG. 2. AV decoder 214 provides the baseband audio and video data to the HDMI sending unit 210. The audio and video data are applied to the HDMI transmitter 211 and are sent through the HDMI TMDS channels 120, 122, 124, and 126 or through the FRL lanes 166, 168, 170, and 172, described above with reference to FIGS. 1A and 1B, to an HDMI receiving unit of the sink device. As described above, the video data may be sent during the active region of the video signal and the audio data may be send in data islands during the vertical and/or horizontal blanking intervals of the video signal.

When the encoded video stream includes high dynamic range video data, the audio/video decoder 214 extracts the HDR metadata (e.g., DRAM and/or HDR DME) from the encoded video data and provides it to the HDMI sending unit 210 to be included in data islands to be transmitted inside or outside of frame synchronous transmission windows (FSTWs) of the video data sent to the HDMI receiving unit. For video data provided directly to the audio video decoder 214, any associated HDR metadata may be provided to the metadata acquisition circuitry 218. This metadata may be provided to the InfoFrame processing circuitry 216 to be included in the data islands transmitted by the HDMI transmitter 211.

If the sink device 300 (FIG. 3) supports frame-synchronous processing, then the example InfoFrame processing circuitry 216 formats the metadata sent by the HDMI transmitter 211 so that the AVI InfoFrames, DRAM InfoFrames, and HDR DME InfoFrames are all sent in data islands during FSTWs of the video signal. Alternatively, when the source device 200 determines that the sink device 300 does not support dynamic HDR, the InfoFrame processing circuitry 216 does not format the HDR DME for transmission to the sink device 300. The InfoFrames for sink devices that do not support dynamic HDR may be sent in data islands of the same portion of the vertical blanking interval as the FSTW (i.e., starting at the first blank pixel that immediately follows the last active video pixel of a video frame/field and ending FAPA_end lines prior to the start of the next active region). Because the sink device does not support dynamic HDR and, thus, does not support FSTWs, metadata sent in these data islands will not receive frame synchronous processing.

Figure 3:
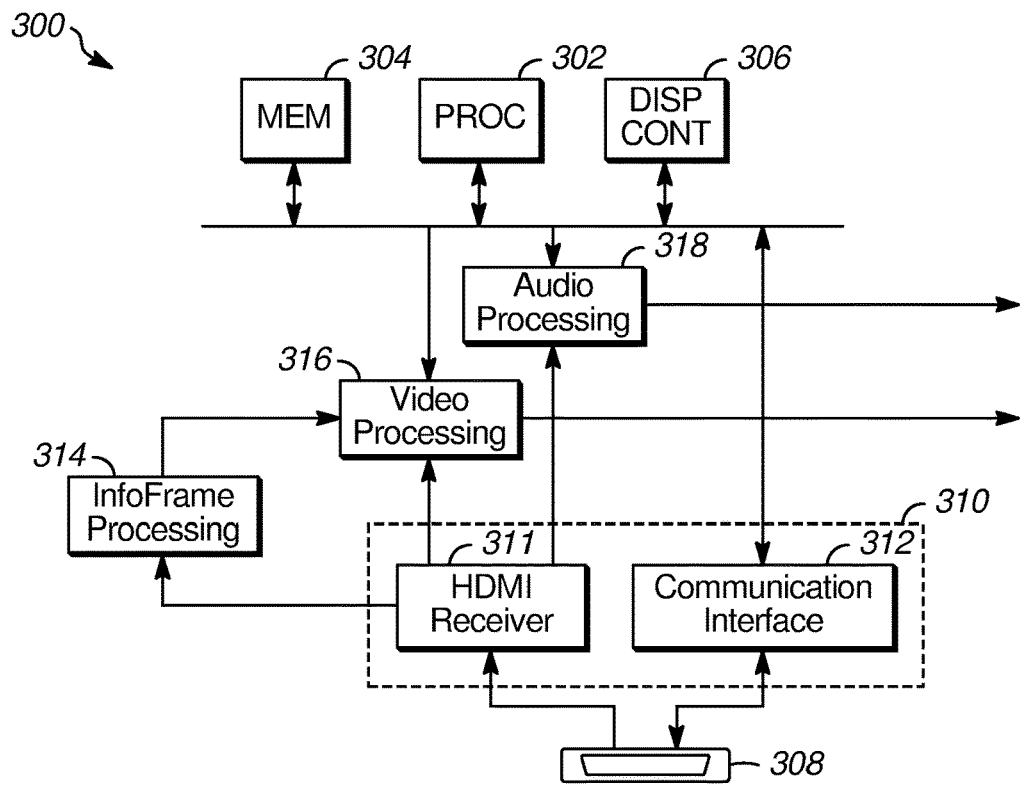
FIG. 3 is a block diagram of an HDMI sink device according to an example embodiment.

FIG. 3 is a block diagram of a sink device 300 according to an example embodiment. The sink device 300 is able to process video streams including SDR, S-HDR and dynamic HDR video sequences and frame-synchronously process metadata for all of the video sequences. The example sink device 300 includes a processor 302, memory 304, display controller 306, audio processing circuitry 318, video processing circuitry 316, InfoFrame processing circuitry 314, and an HDMI receiving unit 310 including HDMI receiver 311 and communication interface 312. The HDMI receiving unit 310 is coupled to an HDMI connector 308.

The processor 302 controls the operation of other components of the HDMI sink device 300. The memory 304 holds data and instructions for the processor 302. The processor 302 may operate the display controller 306 to control a display panel (not shown) used to control the operation of the HDMI sink device 300. The controller 306 may also interface with an input device such as a touchscreen and/or keypad (not shown) to allow a user to input data for controlling the HDMI sink device 300. The sink device 300 receives audio and video data via the TMDS channels 120, 122, 124 and 126 or FRL lanes 166, 168, 170 and 172, described above with reference to FIGS. 1A and 1B. The example sink device 300 extracts the AVI InfoFrames, DRAM InfoFrames and/or HDR DME InfoFrames containing the SDR and HDR metadata from data islands of the FSTW region of VBI of the video signals and provides the metadata to the video processing circuitry 316.

The HDMI receiving unit 310 extracts audio data from the data islands in the horizontal and vertical blanking intervals of the video signal outside of the FSTW and provides the audio data to the audio processing circuitry 318. The audio data generated by the audio processing circuitry 318 and the video data generated by the video processing circuitry 316 are provided to a presentation device including a monitor (not shown) and a sound system (not shown).

Each of the memories 204 and 304 may include volatile memory and/or non-volatile memory. The non-volatile memory may include removable storage and non-removable storage. Computer storage includes random access memory (RAM), read-only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The various processing devices and circuits shown in FIGS. 2 and 3 may employ computer-readable instructions stored on a computer-readable medium that are executable by the processor 202, audio/video decoder 214, InfoFrame processing circuitry 216, and/or metadata acquisition circuitry 218 of the source device 200 or the processor 302, InfoFrame processing circuitry 314, video processing circuitry 316, and/or audio processing circuitry 318 of the sink device 300. A hard drive, CD-ROM, and RAM are some examples of articles including a non-transitory computer-readable medium such as a storage device. The terms "computer-readable medium" and "storage device" do not include carrier waves to the extent carrier waves are deemed too transitory.

As described below with reference to FIGS. 6-9B, the HDMI receiver 311 extracts SDR metadata from AVI InfoFrames, S-HDR metadata from DRAM InfoFrames, and/or dynamic HDR metadata from HDR DME InfoFrames in the data islands received during the FSTW and provides at least the S-HDR metadata and dynamic HDR metadata to InfoFrame processing circuitry 314. This metadata may include, for example and without limitation, data describing the format of the video data (e.g., the number of bits or the color configuration) and data describing an EOTF to be applied to the video data prior to display.

The communication interface 312 of the HDMI receiving unit 310 is controlled by the processor 302 to communicate with the source device 200 via the DDC/SDA/SCL channel of the HDMI interface. The processor 202 uses this interface to receive commands and data from, and to transmit commands and data to, the source device 200 via the communication interface 312. For example, the sink device 300 may provide to the source device 200 information (e.g., a vendor-specific data block (VSDB)) indicating the capabilities of the sink device 300. Similarly, the sink device 300 may obtain information about the source device 200 via the DDC/SDA/SCL channel of the HDMI interface.

Figure 4:
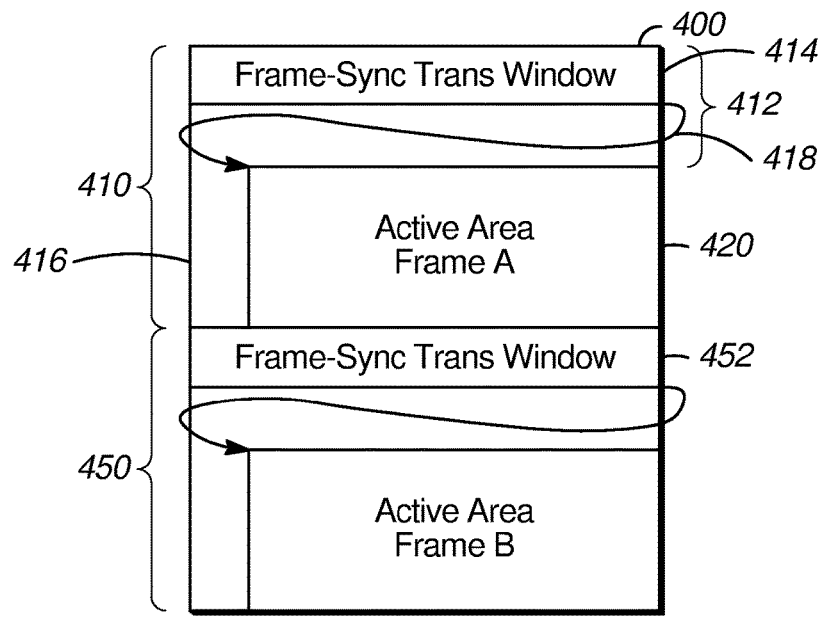
FIG. 4 is a timing diagram showing a sequence of video fields/frames including frame synchronous transmission windows (FSTWs) according to an example embodiment.

FIG. 4 is a timing diagram showing a sequence of video fields/frames 400 including frame-synchronous transmission windows (FSTWs) 414 and 452 according to an example embodiment. The example sequence of fields/frames 400 includes two video fields/frames 410 and 450. As shown with reference to field/frame 410, each field/frame includes a vertical blanking interval (VBI) 412, a horizontal blanking interval (HBI) 416, and an active video area 420. The vertical blanking interval 412 includes a FSTW 414 and a non-FSTW region 418. The FSTW 414 begins on the first blank pixel that immediately follows the last active video pixel of a video frame/field and ends FAPA_end lines prior to the start of the next active video area 420, where FAPA_end is defined in section 10.10.1.1 of the HDMI 2.1 technical standard. Control data sent during the FSTW 414 is applied to the active video data in the active video area 420 immediately following the VBI 412 in which the FSTW 414 occurs. The control information may include, without limitation, auxiliary video information (AVI) InfoFrames (AVI IFs), DRange and Mastering (DRAM) InfoFrames (DRAM IFs) and HDR DME InfoFrames (HDR DME IFs).

In sink devices that support frame-synchronous processing, control information in the HDR DME is applied to the immediately following active video data so dynamic HDR video data in the active video area 420 is properly displayed. Sink devices supporting frame synchronous processing identify the HDR DME and copy metadata data to appropriate control registers and memory elements in the sink device 300. This may include, for example, copying EOTF data to implement a particular EOTF to be used for displaying the dynamic HDR video data or configuring the sink device 300 to handle the pixel depth (e.g., the number of bits in each pixel) or a particular color space configuration indicated by the HDR DME.

The example sink device 300 includes a vendor-specific data block (VSDB) (not shown), for example in the E-EDID, containing information on the capabilities of the sink device 300. The VSDB may indicate that the sink device 300 supports only SDR video data; SDR and S-HDR video data; or SDR, S-HDR, and dynamic HDR video data. As described above, when the sink device 300 does not support either dynamic HDR video data or S-HDR data, the source device may convert the dynamic HDR data to S-HDR data compatible with the AVI InfoFrames, and may convert the S-HDR data to SDR data compatible with the AVI InfoFrames before sending the converted video data to the sink device 300. The example embodiments send the AVI InfoFrames, DRAM InfoFrames, and HDR DME InfoFrames during the region of the vertical blanking interval beginning at the first blank pixel that immediately follows the last active video pixel of a video frame/field and ending FAPA_end lines prior to the start of the next active region. This region corresponds to the FSTW 414 described above.

Figure 5:
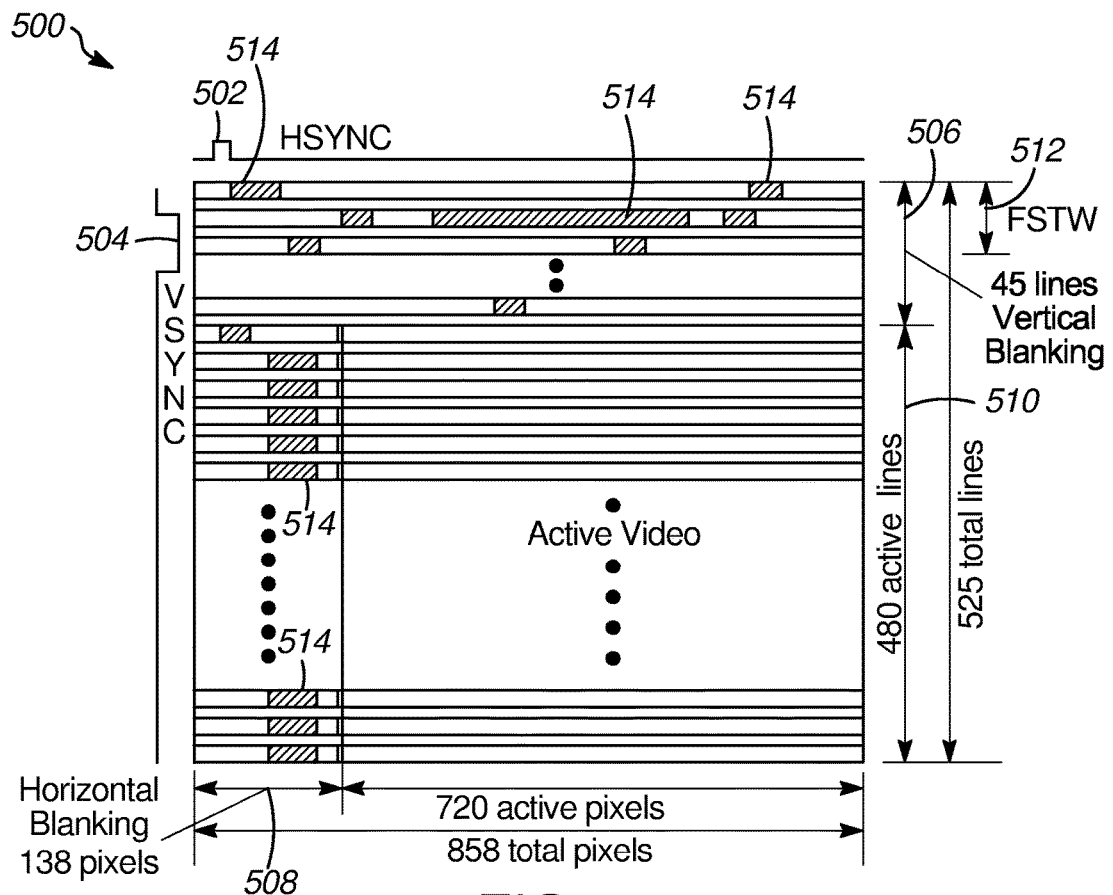
FIG. 5 is a timing diagram showing a single video field/frame according to an example embodiment.

FIG. 5 is a timing diagram showing a single video 720P field/frame 500 according to an example embodiment. The field/frame 500 shown in FIG. 5 includes a horizontal sync pulse 502, a vertical sync pulse 504, a VBI 506, a horizontal blanking interval (HBI) 508, and an active pixel area 510. The VBI 506 includes the FSTW 512. Also included in the VBI 506 and HBI 508 are multiple data islands 514. As described above, audio data associated with the video data in the active pixel area 510 is sent in VBI 506 and HBI 508. The audio data and other auxiliary data may be sent in data islands 514 of the VBI 506 and HBI 508. As described above, in the example embodiment, video metadata, including AVI InfoFrames, DRAM InfoFrames, and HDR DME InfoFrames are also sent in data islands 514, but during the FSTW 512.

Figure 6:
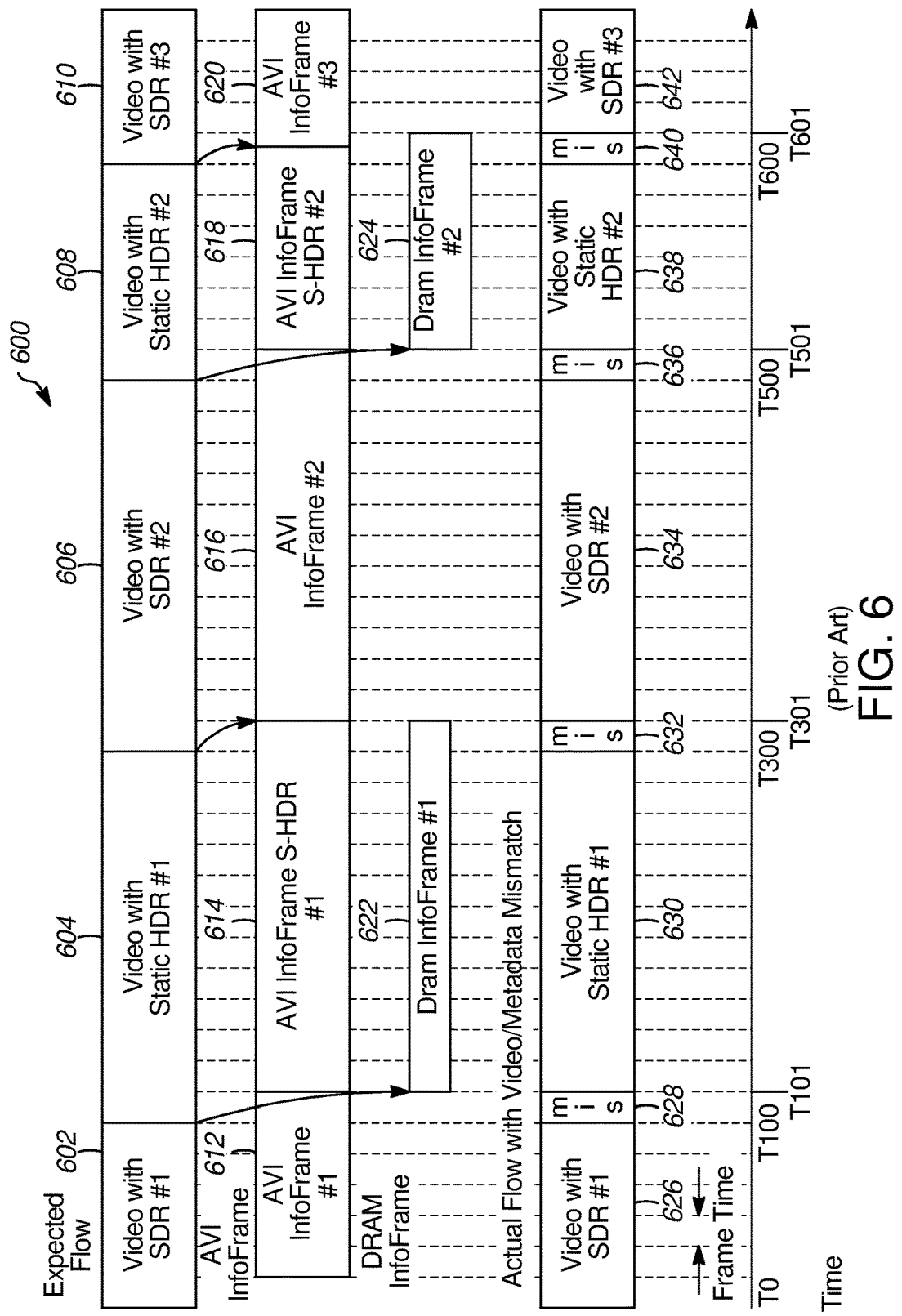
FIG. 6 is a timing diagram showing a stitched linear video stream having static high dynamic range (S-HDR) and standard dynamic range (SDR) video sequences.

FIG. 6 is a timing diagram for an existing HDMI system conforming to HDMI 2.0. The timing diagram shows a video sequence 600 having transitions between static high dynamic range (S-HDR) and standard dynamic range (SDR) video fields/frames. FIG. 6 illustrates artifacts that may occur on transitions from S-HDR video frames to SDR video frames. FIG. 6 illustrates an expected flow of video information and an actual flow showing image artifacts resulting from mismatches between the video data and the metadata used to process the video data. The expected flow includes a first SDR sequence 602 of video fields or frames followed by a first sequence 604 of S-HDR video fields or frames. The sequence 604 is followed by a second sequence 606 of SDR fields/frames, a second sequence 608 of S-HDR video fields/frames, and a third SDR sequence 610 of video fields/frames.

Metadata for the SDR and S-HDR video data is contained in AVI InfoFrames. Although FIG. 6 shows the AVI InfoFrames and DRAM InfoFrames spanning multiple frame times, the AVI InfoFrames and DRAM InfoFrames may be received during each field/frame interval or during alternate fields/frame intervals. Thus, data in an AVI InfoFrame or DRAM InfoFrame may be applied to one video field/frame or to two consecutive video fields/frames. The metadata for the first SDR sequence 602 is contained in a first AVI InfoFrame 612 which, as shown in FIG. 6, is received in field/frame time T1 and is active over field/frame times T1 to T100. At T100, the AVI InfoFrame 614 for the first S-HDR sequence 604 is received and is active over fields/frames T100 to T301. At field/frame time T300, the sink device 300 receives the second AVI InfoFrame 616 corresponding to the field/frame sequence 606 having the second SDR sequence. As shown in FIG. 6, however, the data in the InfoFrame 616 does not become active until field/frame time T301. At field/frame time T500, AVI InfoFrame 618 for the second S-HDR sequence 608 is received and is active from field/frame time T500 to field/frame time T601. At field/ frame time T600, the sink device 300 receives the AVI InfoFrame 620 for the third SDR sequence 610 which does not become active until field/frame time T601.

The metadata for the S-HDR video sequence 604 is contained in an AVI InfoFrame 614 and in DRAM InfoFrame 622, which are transmitted by the source device 200 at field/frame time T100 but do not become active until field/frame time T101. Similarly, at field/frame time T500, the source device 200 sends the second S-HDR metadata in AVI InfoFrame 618 and DRAM InfoFrame 624. The metadata in these two InfoFrames 618, 624 becomes active at field/frame time T501 and remains active until time T601, when the metadata in the AVI InfoFrame 620 for the third SDR sequence 610 becomes active.

In FIG. 6, the first displayed SDR sequence 626 is presented between field/frame times T0 and T100 and the first displayed S-HDR sequence 630 is presented between field/frame times T100 and T300. Between field/frame times T300 and T500, the second displayed SDR sequence 634 is presented; between field/frame times T500 and T600, the second displayed S-HDR sequence 638 is presented; and after field/frame time T600, the third displayed SDR sequence 642 is presented.

As shown in FIG. 6, the actual flow of the video data may exhibit artifacts caused by a mismatch between the video data being processed and the metadata used to process it. This mismatch occurs, for example, in the video field/frame 628 displayed between field/frame times T100 and T101, video field/frame 632 displayed between field/frame times T300 and T301, video field/frame 636 displayed between field/frame times T500 and T501, and video field/frame 640 displayed between field/frame times T600 and T601. These artifacts occur because the video data being displayed in these intervals is processed using metadata corresponding to the video data from prior fields/frames. For example, the artifact occurring in the video field/frame 636 between field/frame times T500 and T501 occurs because S-HDR video sequence 638 is interpreted without using the S-HDR metadata contained in the AVI InfoFrame 618 and DRAM InfoFrame 624. This distortion may be manifest as incorrect dimming with missing shadow details and possibly incorrect color rendering. It is noted that this distortion may be relatively insignificant, occupying a single field/frame between longer segments of video field/frames, for example at the beginning and/or end of a television program.

Figure 7:
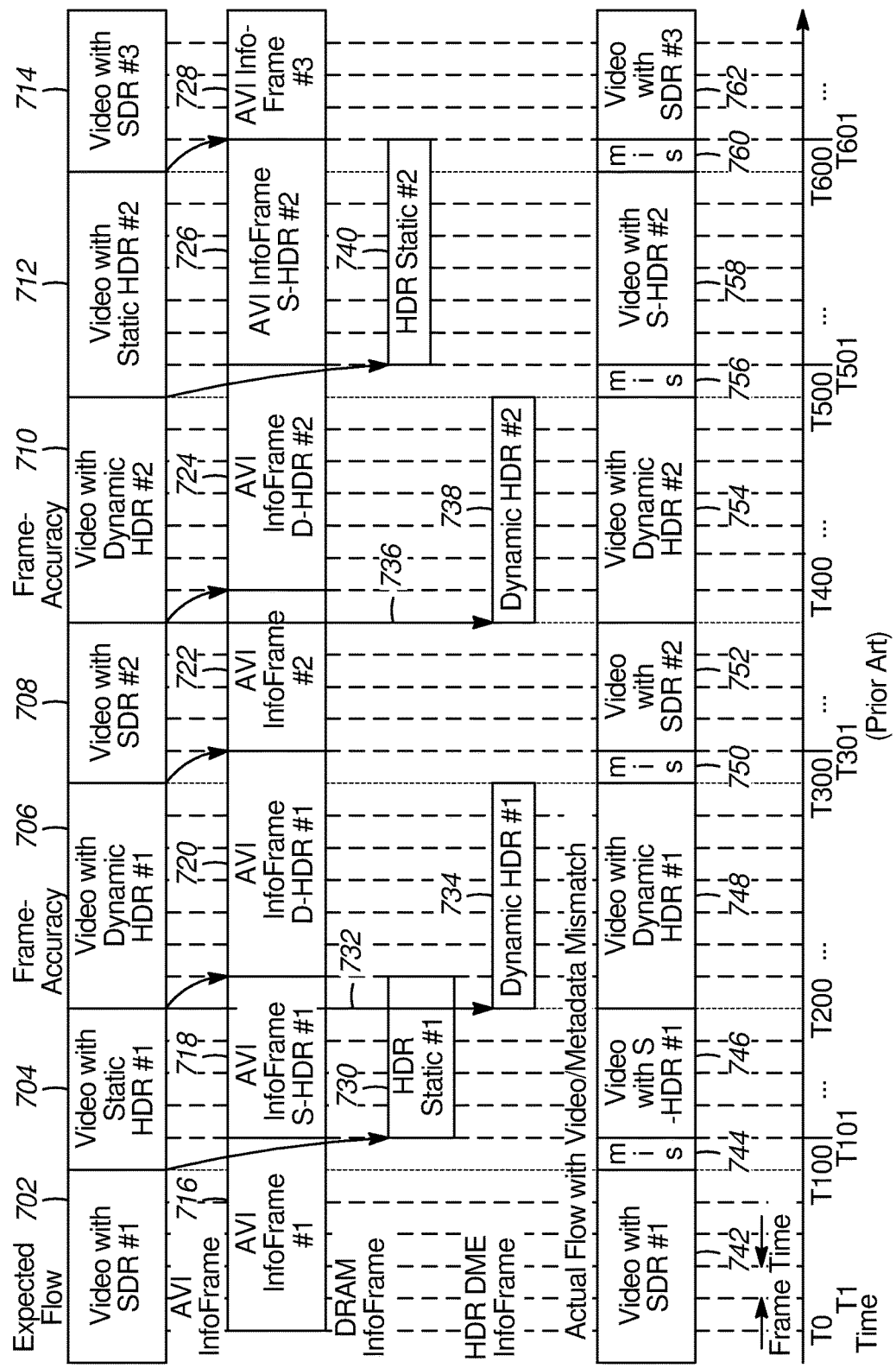
FIG. 7 is a timing diagram showing a stitched linear video stream having including SDR, S-HDR, and dynamic HDR video sequences.

FIG. 7 is a timing diagram of a video sequence 700 showing transitions among SDR, S-HDR, and dynamic HDR video frames that conform to the HDMI 2.1 standard. In addition to SDR and S-HDR video sequences, the example shown in FIG. 7 includes two video sequences having dynamic HDR video data. The metadata, HDR DME, associated with the dynamic HDR video data for a particular set of fields/frames is sent in AVI InfoFrames and HDR DME InfoFrames during the FAPA area of a VBI and is processed in a frame-synchronous manner, such that it is applied to the video data occurring immediately after the VBI. Because the HDR DME InfoFrames are applied frame-synchronously, the HDR DME InfoFrames are sent in the FAPA region preceding the active video interval of each dynamic HDR frame. The metadata for the SDR video and S-HDR video is included in data islands in the VBI that are outside of the FAPA area. The expected video flow in FIG. 7 includes a first SDR video sequence 702 between field/frame times T0 and T100; a first S-HDR video sequence 704 between field/frame times T100 and T200; a first dynamic HDR video sequence 706 between field/frame times T200 and T300; a second SDR video sequence 708 between field/frame times T300 and T400; a second dynamic HDR video sequence 710 between field/frame times T400 and T500; a second S-HDR video sequence 712 between field/frame times T500 and T600; and a third SDR video sequence 714 after field/frame time T600.

The metadata for the SDR video is contained in AVI InfoFrames. The AVI InfoFrame 716 containing metadata or the first SDR video sequence 702 is received in data islands during the non-FAPA area of the VBI or during the HBI of the field/frame starting at field/frame time T0. As shown in FIG. 7, however, this metadata is not available for use by the video processing circuitry 316 (shown in FIG. 3) until field/frame time T1. The first SDR AVI InfoFrame 716 metadata is active between field/frame times T1 and T100. At frame/field time T100, metadata for the first S-HDR video sequence 704 is received during the non-FAPA area of the VBI or during the HBI. This metadata includes AVI InfoFrame 718 and DRAM InfoFrame 730. As shown in FIG. 7, however, this metadata does not become active until field/frame time T101. The metadata for the first S-HDR video sequence 704 is active between field/frame times T101 to T200.

At field/frame time T200, the sink receives the first dynamic HDR video sequence 706 and accompanying metadata including AVI InfoFrame 720 and HDR DME 734. The AVI InfoFrame 720 is received outside of the FAPA interval of the VBI while the HDR DME is received during the FAPA interval (FAPA0 or FAPA1) of the VBI. As shown in FIG. 7, because it is received during the FAPA interval, the HDR DME 734 is processed in a frame-synchronous manner and becomes active at field/frame time T200, as indicated by the arrow 732, while the AVI InfoFrame 720 does not become active until field/frame time 201. The dynamic HDR metadata remains active until field/frame time T300.

At field/frame time T300, the sink receives the second SDR video sequence 708 and the AVI InfoFrame 722 containing the metadata for the second SDR sequence 708. Because the AVI InfoFrame 722 is received outside of the FAPA area of the VBI, it does not become active until field/frame time T301 and remains active until field/frame time T400.

At field/frame time T400, the sink receives the second dynamic HDR video sequence 710 and accompanying metadata including AVI InfoFrame 724 and HDR DME 738. As shown in FIG. 7, AVI InfoFrame 724, which was received outside of the FAPA area of the VBI, does not become active until after field/frame time T400 while HDR DME 738, which is received during the FAPA area, becomes active at field/frame time T400 as indicated by arrow 736. The dynamic HDR metadata remains active until field/frame time T500.

The sink receives the second S-HDR video sequence 712 and accompanying metadata at field/frame time T500. The S-HDR metadata includes AVI InfoFrame 726 and DRAM InfoFrame 740. Both of these frames are received outside of the FAPA area of the VBI and, thus, do not become active until field/frame time T501. The metadata for the second S-HDR video sequence 712 remains active between field/frame times T501 and T601.

At time T601, the sink receives the third SDR video sequence 714 and its accompanying metadata, AVI InfoFrame 728. Because the AVI InfoFrame 728 is received outside of the FAPA area, it does not become active until field/frame time T601.

The actual flow includes several instances of mismatch between the displayed video data and the dynamic range metadata used to process the video data. For example, the display begins with displayed SDR video sequence 742 at field/frame time T100 followed by a mismatch interval 744 between field/frame times T100 and T101. This mismatch occurs because the first S-HDR video sequence 704 is processed using the SDR metadata because the metadata in the AVI InfoFrame 718 and DRAM InfoFrame 730 for the S-HDR video sequence 704 have not been transferred to the InfoFrame processing circuitry 314 (e.g., have not become active) until field/frame time T101. From field/frame time T101 to T200, the S-HDR video data 746 is properly displayed using the first S-HDR metadata. Even though the DRAM InfoFrame 730 metadata is active until field/frame time 201, there is no mismatch at the transition beginning at field/frame time T200 because the HDR DME 734 metadata overrides the DRAM InfoFrame 730 metadata. Because it is received during the FAPA0 interval, the first HDR DME 734 metadata is processed in a frame-synchronous manner and is transferred to the InfoFrame processing circuitry 314 so that the metadata may be passed to the video processing circuitry 316 in time to process the video data at field/frame time T200. The displayed dynamic HDR video sequence 748 continues to field/frame time T300 at which there is another mismatch 750. At field/frame time T300, the first HDR DME metadata 734 is no longer active; however, the second SDR metadata has not yet become active. The mismatch 750 occurs because the SDR video information in the field/frame starting at time T300 is processed using the AVI InfoFrame 720 metadata. Once SDR metadata in AVI InfoFrame 722 becomes active at field/frame time T301, the system properly displays the SDR video data 752 until field/frame time T400. At T400, again due to the frame-synchronous processing, the system properly displays the dynamic HDR video data 754 using the second HDR DME 738 metadata and AVI InfoFrame 724. A mismatch 756 occurs, however, in the field/frame starting at T500 because the second S-HDR metadata in DRAM InfoFrame 740 has not become active, so that the corresponding S-HDR video data is processed using the metadata in the AVI InfoFrame 724 for the second dynamic HDR video sequence. Once the metadata in the AVI InfoFrame 726 and the DRAM InfoFrame 740 become active at T501, the second S-HDR video data 758 is displayed properly. The actual flow continues at field/frame time T600 with another mismatch 760, when the third SDR video sequence 714 is processed using the second S-HDR metadata contained in the InfoFrames 726 and 740. The SDR video data 762 displays properly after field/frame time T601.

Although the examples in FIGS. 6 and 7 show a delay of one frame/field time for the activation of metadata from an AVI InfoFrame or a DRAM InfoFrame, it is contemplated that there may be longer delays, for example, four or more field/frame times. These longer delays may result in more visible artifacts.

The visual artifacts that occur on switching to SDR or S-HDR from dynamic HDR may be more noticeable than those which occur on switching between SDR and S-HDR because, due to the dynamic nature of dynamic HDR metadata, the changes may be less predictable, unlike legacy HDMI in which the changes are 'static' or 'pseudo-static.' The HDMI 2.1 Specification implements frame-accuracy for switching on HDR DME processing but not for switching off HDR DME processing. The visual artifacts experienced during the mismatch intervals may include reduced contrast, for mismatch interval 744, when S-HDR video is incorrectly interpreted as SDR video, or incorrect dimming with missing shadow details for mismatch 760, when SDR video is incorrectly interpreted as S-HDR video. The artifacts may also include incorrect color. The occurrence of these artifacts may be increased in systems operating according to the HDMI 2.1 standard due to the addition of dynamic HDR sequences, since the dynamic HDR sequences may be stitched with S-HDR or SDR in a linear stream before delivery, resulting in more frequent and more visible artifacts.

Figure 8:
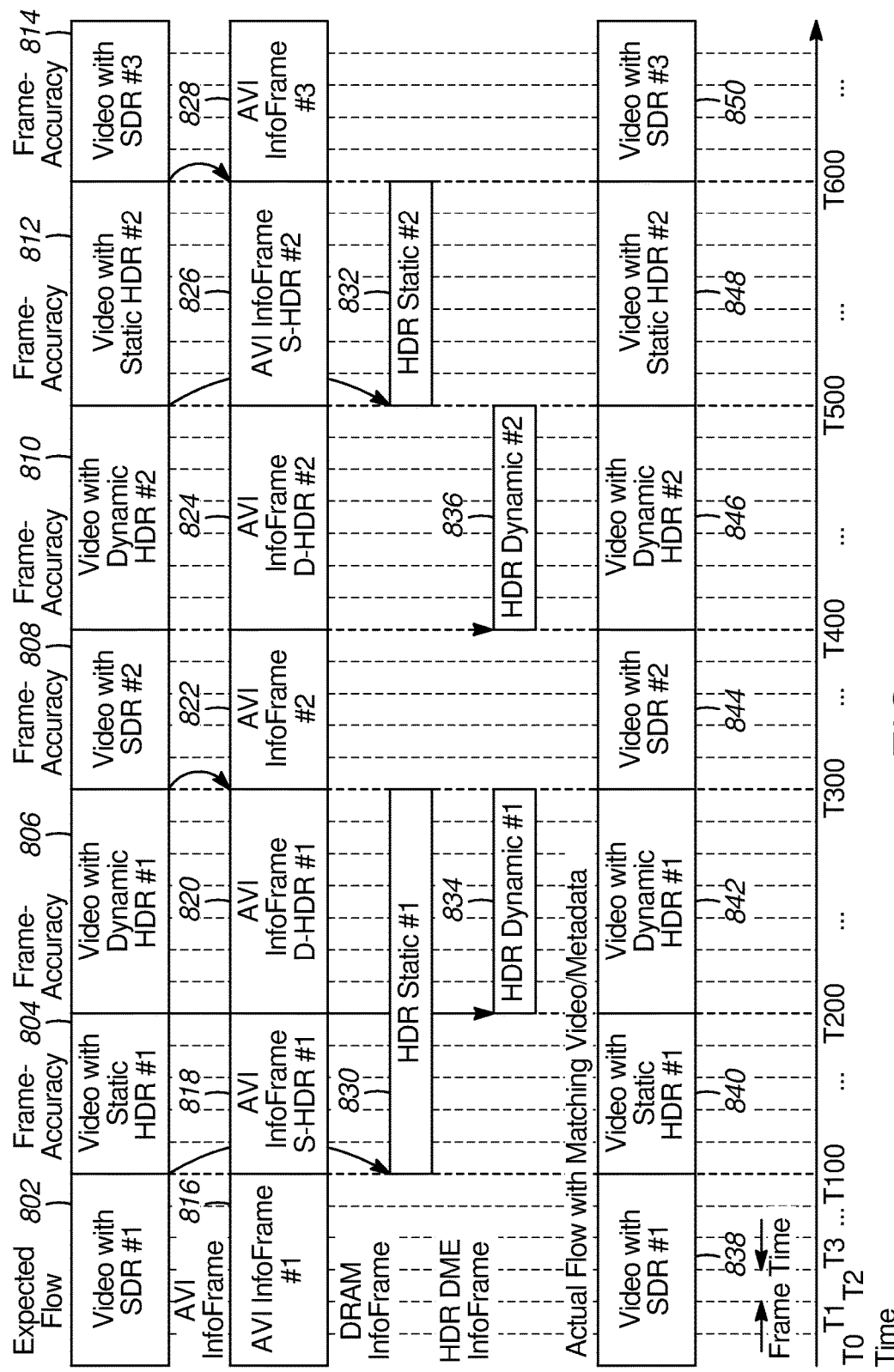
FIG. 8 is a timing diagram showing a stitched linear video stream including SDR, S-HDR, and dynamic HDR video sequences according to example embodiments.

FIG. 8 is a timing diagram showing transitions among SDR, S-HDR, and dynamic HDR video sequences according to an example embodiment. In the embodiment shown in FIG. 8, all transitions among SDR, S-HDR and dynamic HDR are frame-synchronous transitions. This may be achieved, for example, because the sink device is capable of frame-synchronous processing and the metadata for the SDR, S-HDR, and dynamic HDR video sequences is received in the frame-synchronous transmission window (FSTW). As described above, the FSTW begins on the first video blank pixel that immediately follows the last active video pixel of a video frame/field and ends FAPA_end lines prior to the start of the next active region (as described in section 10.10.1.1 of the High-Definition Multimedia Interface Specification Version 2.1). When the sink device implements frame-synchronous processing, the example source device sends the metadata during the VBI in an area corresponding to the FSTW. When the sink device does not implement frame-synchronous processing, the metadata may be sent in data islands anywhere in the VBI and/or HBI and it will be handled as described above and activated with a delay of one to four field/frame times.

FIG. 8 shows a sequence of video data including a first SDR video sequence 802, a first S-HDR video sequence 804, a first dynamic HDR video sequence 806, a second SDR video sequence 808, a second dynamic HDR video sequence 810, a second S-HDR video sequence 812, and a third SDR video sequence 814. The first SDR video sequence 802 includes metadata defined in AVI InfoFrames 816. The SDR metadata also includes SDR metadata for the second SDR video sequence 808 in AVI InfoFrames 822. SDR metadata for the third SDR video sequence 814 is contained in AVI InfoFrames 828. Metadata for the first S-HDR video sequence 804 is in AVI InfoFrames 818 and DRAM InfoFrame 830, while metadata for the second S-HDR video sequence 812 is in AVI InfoFrame 826 and DRAM InfoFrame 832. Metadata for the first dynamic HDR video sequence 806 is in AVI InfoFrame 820, DRAM InfoFrame 830, and HDR DME InfoFrame 834, while metadata for the second dynamic HDR video sequence 810 is contained in AVI InfoFrame 824 and HDR DME InfoFrame 836.

As shown in FIG. 8, dynamic HDR video may use metadata from AVI InfoFrames and HDR DME InfoFrames. Optionally, dynamic HDR video may also use metadata from DRAM InfoFrames, as shown by the DRAM InfoFrame 830. The source device 200 determines the use case for each video sequence and formats the metadata appropriately. The metadata used by a particular video sequence may be determined from packet headers in the corresponding InfoFrames.

In the example shown in FIG. 8, all of the AVI InfoFrames 816, 818, 820, 822, 824, 826, and 828; the DRAM InfoFrames 830 and 832; and the HDR DME InfoFrames 834 and 836 are handled in a frame-synchronous manner Thus, as shown in the actual flow, the video data is processed using its corresponding metadata and there are no mismatches. The sequence in which the video data is displayed includes the displayed SDR video sequence 838 followed by the displayed S-HDR video sequence 840, the displayed dynamic HDR video sequence 842, the displayed SDR video sequence 844, the displayed dynamic HDR video sequence 846, the displayed S-HDR video sequence 848, and the displayed SDR video sequence 850.

To minimize visual artifacts in sinks that do not support frame-accuracy, the source device 200 sends the data to the sink device 300 according to the legacy HDMI standards so that all video packets are accurately processed within a set amount of time, for example, one to four fields/frames times after each video transition.

Figure 9A:
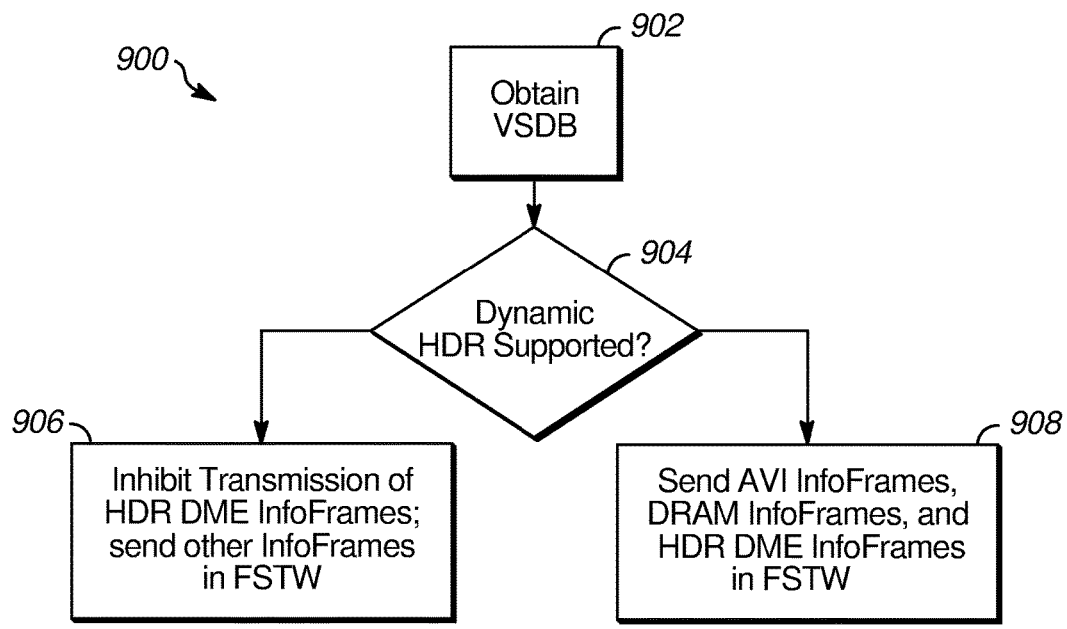
FIG. 9A is a flowchart diagram useful for describing the operation of a source device according to an example embodiment.

FIG. 9A is a flowchart diagram useful for describing the operation of the source device 200 capable of processing metadata for frame-synchronous operation according to an example embodiment. At block 902 of a process 900, when the source device 200 is powered on, the source device 200 obtains the VSDB from the sink device 300 to which it is connected using the communication interface 212 of the HDMI cable 140 or 182, described above with reference to FIGS. 1A, 1B and 2. If, at block 904, the source device 200 determines that the sink device 300 cannot process dynamic HDR video sequences, then the source device 200, at block 906, inhibits transmission of any HDR DME InfoFrames. For these sink devices, AVI InfoFrame metadata and DRAM metadata is transmitted during an interval of the VBI corresponding to the FSTW.

When, at block 904, the source device 200 determines that the sink device 300 can process dynamic HDR video sequences, the source device 200, at block 908, formats the video data so that all of the metadata in the AVI InfoFrames, DRAM InfoFrames, and HDR DME InfoFrames is sent during the FSTW.

Figure 9B:
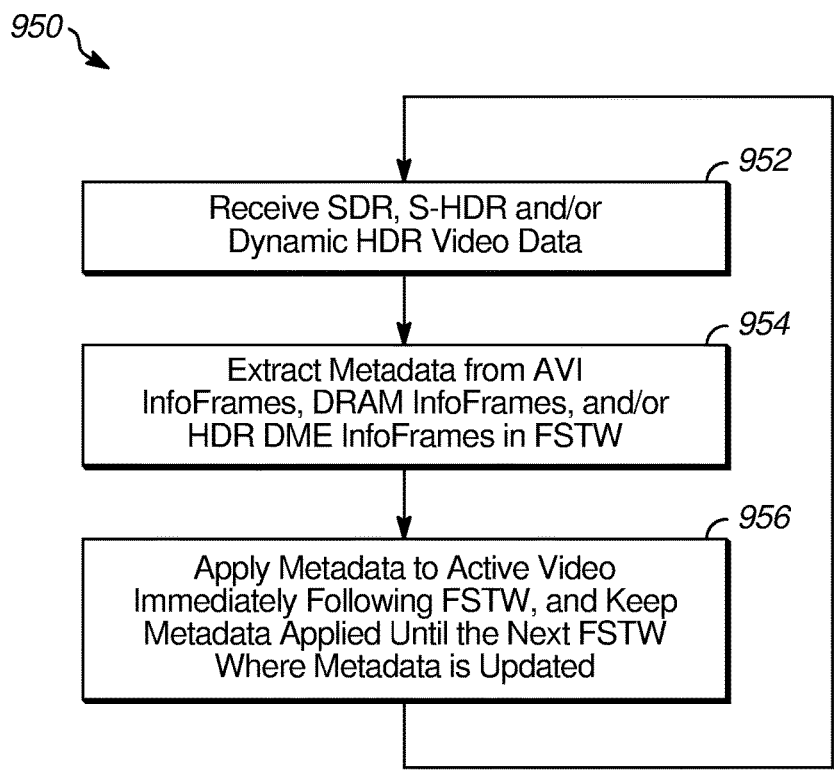
FIG. 9B is a flowchart diagram useful for describing the operation of a sink device according to an example embodiment.

FIG. 9B is a flowchart diagram useful for describing the operation of the sink device 300 capable of frame-synchronous processing according to an example embodiment. At block 952 of a process 950, the sink device 300 obtains the video sequences which may include SDR, S-HDR, and dynamic HDR video sequences. At block 954, the sink device 300 extracts the metadata from AVI InfoFrames, DRAM InfoFrames, and/or HDR DME InfoFrames received during the FSTW. At block 956, the process 950 applies the metadata to the active video immediately following the VBI containing the FSTW. Thus, all video sequence metadata is processed in a frame-synchronous manner, whether it is metadata for an SDR sequence, an S-HDR sequence, or a dynamic HDR sequence. Although not shown in FIG. 9B, when the sink device 300 receives video from a source device that is not compatible with frame-synchronous processing, it processes the video in the same way as a legacy device (e.g., a device operating according to the HDMI 2.0 or HDMI 1.4 standard).

The metadata describes how the video data sent during the active video interval is to be displayed. For example, the metadata may include: information on color remapping; a color volume transform to be applied; maximum, minimum and average luminance values in a scene and target maximum, minimum and average luminance values; data describing a transfer function (e.g. an EOTF) to be applied to the luminance data; and/or data specific to an application running on the source device. The content and format of the metadata is described in a standard issued by the Consumer Technology Association™, entitled A DTV Profile for Uncompressed High Speed Digital Interfaces CTA-861-G (November 2016).

With reference to FIG. 3, the HDMI receiver applies the metadata by extracting it from the received data and passing the extracted metadata to the InfoFrame processing circuitry 314. The InfoFrame processing circuitry, in turn, controls the video processing circuitry 316 so that the video data received during the active video interval is displayed properly on the sink device. The example InfoFrame processing circuitry 314 processes the metadata extracted from the FSTW and controls the video processing circuitry 316 to apply the extracted metadata to the active video data in the same field/frame as the FSTW.

Figure 10:
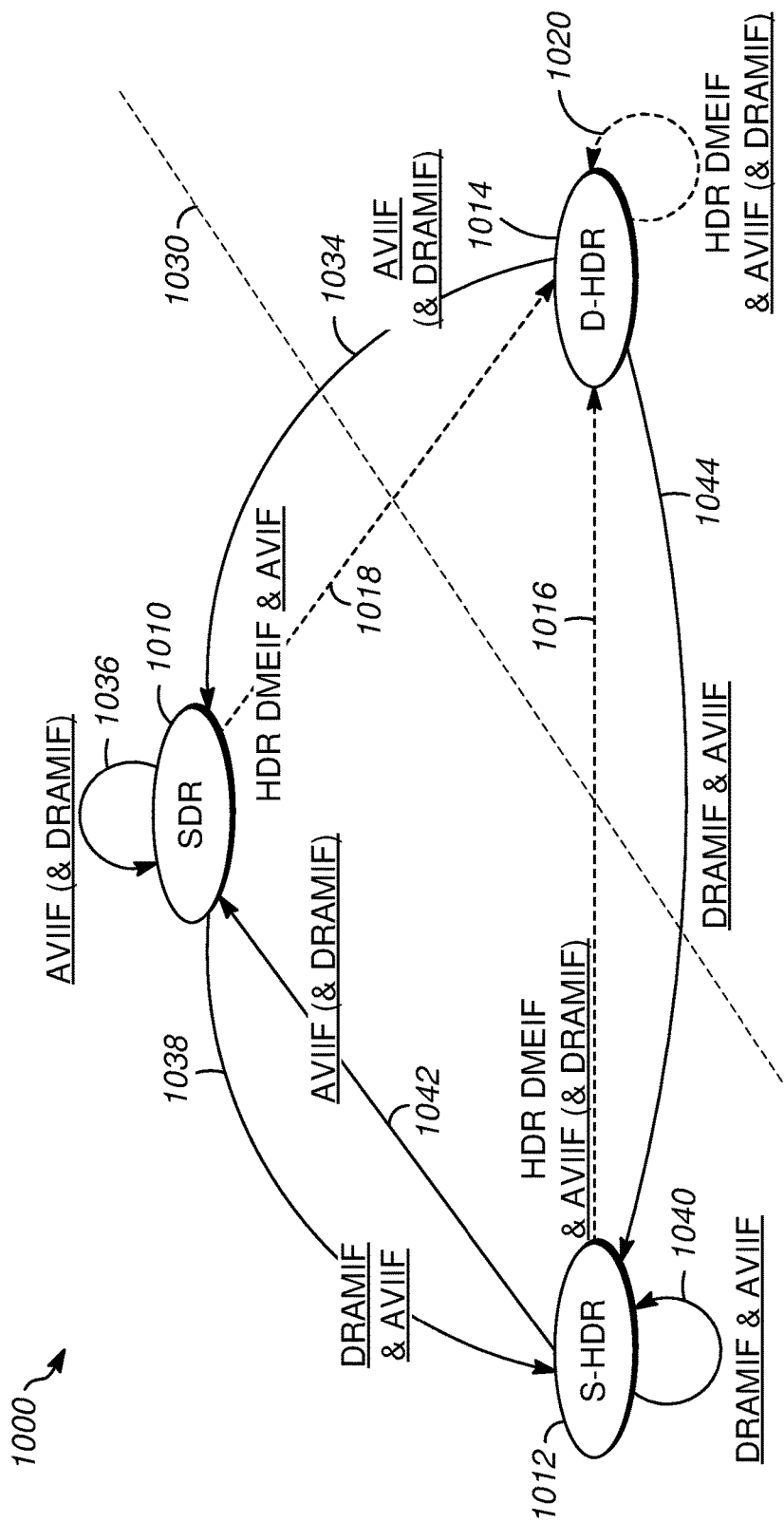
FIG. 10 is a state diagram useful for describing differences among the example embodiments, legacy HDMI, and HDMI 2.1.

FIG. 10 is a state diagram 1000 useful for describing differences among the example HDMI embodiments, HDMI 2.1, and legacy HDMI. The state diagram 1000 includes three states: SDR state 1010, S-HDR state 1012, and dynamic HDR state 1014. These states 1010, 1012, 1014 represent the source device 200 transmitting, and the sink device 300 receiving and displaying, SDR video, S-HDR video, and dynamic HDR video, respectively. The diagonal line 1030 divides legacy HDMI on the left from HDMI 2.1 and the example HDMI embodiments on the right. The other lines in FIG. 10 indicate frame-synchronous metadata transitions. The dashed lines 1016, 1018, and 1020 and the text that is not underlined show the frame-synchronous metadata transitions that occur in HDMI 2.1 while all of the lines 1016, 1018, 1020, 1034, 1036, 1038, 1040, 1042, and 1044 and all of the text, show the frame-synchronous metadata transitions of the example HDMI embodiments.

As described above, with reference to FIG. 7, according to the HDMI 2.1 standard, all metadata transitions to dynamic HDR are frame-synchronous. These includes the metadata transition (line 1018) from the SDR state 1010 to the dynamic HDR state 1014, the metadata transition (line 1016) from the S-HDR state 1012 to the dynamic HDR state 1014, and the metadata transition (line 1020) from one set of dynamic HDR metadata to another set of dynamic HDR metadata within the dynamic HDR state 1014. The text that is not underlined indicates the frame-synchronous transitions that occur in HDMI 2.1. As shown, each metadata transition may include multiple types of InfoFrames. All states, SDR state 1010, S-HDR state 1012, and dynamic HDR state 1014, use AVI InfoFrame metadata. SDR state 1010 optionally includes metadata in DRAM InfoFrames in addition to metadata in AVI InfoFrames, for example when the SDR video is generated from a Blue-Ray disc. This is indicated by the parenthetical (DRAMIF) next to lines 1034, 1036, and 1042 in FIG. 10. Furthermore, while Dynamic HDR always uses metadata from HDR DME InfoFrames and AVI InfoFrames, it may also use DRAM metadata as indicated by the parenthetical (DRAMIF) next to lines 1016 and 1020.

As shown in FIG. 8, according to the example embodiments, all metadata transitions may be frame-synchronous. These include the HDR DME InfoFrames and AVI InfoFrames in the transition (line 1018) from the SDR state 1010 to the dynamic HDR state 1014; and the HDR DME InfoFrames in the transition (line 1020) within the dynamic HDR 1014 state. As shown by the underlined text adjacent to line 1020, in some embodiments, transitions of metadata in the AVI InfoFrames and DRAM InfoFrames within the dynamic HDR state 1014 may also be frame synchronous. As shown by line 1034, transitions of metadata in AVI InfoFrames and optionally DRAM InfoFrames from the dynamic HDR state 1014 to the SDR state 1010 may be frame-synchronous as may be the transitions (line 1036) of metadata in AVI InfoFrames and optionally DRAM InfoFrames within the SDR state 1010. As shown by line 1038, transitions of metadata in AVI InfoFrames and DRAM InfoFrames from the SDR state 1010 to S-HDR state 1012 may be frame-synchronous, as may the transitions of metadata in AVI InfoFrames and DRAM InfoFrames within the S-HDR state 1012, as indicated by line 1040. Line 1042 shows the transition from the S-HDR state 1012 to the SDR state 1010. The AVI InfoFrame metadata and optionally the DRAM InfoFrame metadata transitions for the transition indicated by line 1042 may be frame-synchronous. Finally, as shown by line 1044, AVI InfoFrame and DRAM InfoFrame metadata transitions from the dynamic HDR state 1014 to the S-HDR state 1012 may be frame-synchronous.

Although the examples described above concern metadata transitions related to the changing dynamic range of the video signals, it is contemplated that other metadata transitions in video or audio signals may be implemented as frame-synchronous transitions. For example, object-oriented audio and video data such as may be used in virtual-reality and augmented-reality applications may be transmitted through the HDMI interface. In this instance, frame-synchronous processing may be desirable to coordinate the video and audio data to motions and/or gestures of the user.

What is claimed is:

1. An apparatus for use in a source device for transmitting data using a high definition media interface (HDMI), the apparatus comprising: an HDMI interface for transmitting data to and receiving data from a sink device;
   a memory holding executable code;
   and a processor, coupled to the memory and to the HDMI interface, the processor configured by the executable code to: receive video data and metadata for transmission to the sink device;
   encode the metadata in an auxiliary video information (AVI) information frame (InfoFrame);
   and transmit the AVI InfoFrame during a frame-synchronous transmission window (FSTW) of the video data, wherein the FSTW begins during a video blanking interval (VBI) of the video data, on a first video blank pixel that immediately follows a last active video pixel of a preceding video frame or video field and ends a predetermined number of video lines after a start of the VBI.

2. The apparatus of claim 1, wherein the received video data includes standard dynamic range (SDR) video data and the metadata is metadata for the SDR video data.

3. The apparatus of claim 1, wherein the received metadata includes metadata for a static high dynamic range (S-HDR) video sequence and the processor is configured by the executable code to: encode the metadata for the S-HDR video sequence in the AVI InfoFrame and in a DRange and Mastering (DRAM) InfoFrame;
   and transmit the AVI InfoFrame and the DRAM InfoFrame during the FSTW.

4. The apparatus of claim 1, wherein the received metadata includes metadata for a dynamic high dynamic range (HDR) video sequence and the processor is configured by the executable code to: encode the metadata for the dynamic HDR video sequence in the AVI TnfoFrame and in a HDR dynamic metadata extended (HDR DME) InfoFrame;
   and transmit the AVI TnfoFrame and the HDR DME TnfoFrame during the FSTW.

5. An apparatus for use in a sink device for receiving data using a high-definition media interface (HDMI), the apparatus comprising: an HDMI interface for receiving data from a source device; a memory holding executable code;
   and a processor, coupled to the memory and to the HDMI interface, the processor configured by the executable code to: receive a video sequence from the source device, the video sequence including a plurality of video fields or video frames, each video field or video frame including an active video interval and a vertical blanking interval (VBI);
   extract an auxiliary video information (AVI) information frame (InfoFrame) including first metadata for the video sequence from a frame-synchronous transmission window (FSTW) of the VBI of at least one of the fields or frames of the video sequence, wherein the FSTW begins during the VBI on a first video blank pixel that immediately follows a last active video pixel of a preceding video field or video frame and ends a predetermined number of video lines after a start of the VBI;
   extract the first metadata from the AVI InfoFrame;
   and apply the extracted first metadata to video data in the active video interval of the video field or video frame containing the FSTW.

6. The apparatus of claim 5, wherein the received video sequence includes a static high dynamic range (S-HDR) video sequence and the processor is configured by the executable code to: extract a DRange and Mastering (DRAM) Info Frame from the FSTW of the VBI of the at least one field or frame of the video sequence; extract second metadata from the DRAM Info Frame; and apply the extracted first metadata and the second metadata to the video data in the active video interval of the video field or video frame containing the FSTW.

7. The apparatus of claim 5, wherein the received video sequence includes a dynamic high dynamic range (HDR) video sequence and the processor is configured by the executable code to: extract an HDR dynamic metadata extended (HDR DME) TnfoFrame from the FSTW of the VBI of the at least one field or frame of the video sequence;
   extract second metadata from the HDR DME InfoFrame;
   and apply the extracted metadata and the second metadata to the video data in the active video interval of the video field or video frame containing the FSTW.

8. A method for transmitting data from a source device to a sink device using a high-definition media interface (HDMI), the method comprising: receiving video data and metadata for transmission to the sink device;
   encoding the metadata in an auxiliary video information (AVI) InfoFrame; and
   transmitting the AVI TnfoFrame during a frame-synchronous transmission window (FSTW) of the video data, wherein the FSTW begins during a video blanking interval (VBI) of the video data, on a first video blank pixel that immediately follows a last active video pixel of a preceding video frame or video field and ends a predetermined number of video lines after a start of the VBI.

9. The method of claim 8, wherein receiving the video data and metadata includes receiving standard dynamic range (SDR) video data and the metadata is metadata for the SDR video data.

10. The method of claim 8, wherein: receiving the video data and metadata includes receiving a static high dynamic range (S-HDR) video sequence and metadata for the S-HDR video sequence;
    encoding the metadata includes encoding the metadata for the S-HDR video sequence in the AVI InfoFrame and in a DRange and Mastering (DRAM) InfoFrame;
    and transmitting the AVI InfoFrame includes transmitting the AVI InfoFrame and the DRAM InfoFrame during the FSTW.

11. The method of claim 8, wherein: receiving the video data and metadata includes receiving a dynamic high dynamic range (HDR) video sequence and metadata for the dynamic HDR video sequence;
  encoding the metadata includes encoding the metadata for the dynamic HDR video sequence in the AVI InfoFrame and in a HDR dynamic metadata extended (HDR DME) InfoFrame;
  and transmitting the AVI InfoFrame includes transmitting the AVI InfoFrame and the HDR DME InfoFrame during the FSTW.

12. A method for receiving data from a source device using a high-definition media interface (HDMI), the method comprising: receiving a video sequence from the source device, the video sequence including a plurality of video fields or video frames, each video field or video frame including an active video interval and a vertical blanking interval (VBI);
  extracting an auxiliary video information (AVI) information frame (InfoFrame) including first metadata for the video sequence from a frame synchronous transmission window (FSTW) of the VBI of at least one of the fields or frames of the video sequence, wherein the FSTW begins during the VBI on a first video blank pixel that immediately follows a last active video pixel of a preceding video field or video frame and ends a predetermined number of video lines after a start of the VBI;
  extracting the first metadata from the AVI Info Frame; and applying the extracted first metadata to video data in the active video interval of the video field or video frame containing the FSTW.

13. The method of claim 12, wherein: receiving the video sequence includes receiving a static high dynamic range (S-HDR) video sequence and the method further comprises: extracting a DRange and Mastering (DRAM) InfoFrame from the FSTW of the VBI of the at least one field or frame of the video sequence; extracting second metadata from the DRAM InfoFrame; and applying the second metadata to S-HDR video data in the active video interval of the video field or video frame containing the FSTW.

14. The method of claim 12, wherein: receiving the video sequence includes receiving a dynamic high dynamic range (HDR) video sequence and the method further comprises: extracting an HDR dynamic metadata extended (HDR DME) InfoFrame from the FSTW of the VBI of the at least one field or frame of the video sequence;
  extracting second metadata from the HDR DME InfoFrame;
  and applying the second metadata to dynamic HDR video data in the active video interval of the video field or video frame containing the FSTW.

15. A non-transitory computer-readable medium including program instructions for execution by a processor to configure the processor to transmit data from a source device to a sink device using a high-definition media interface (HDMI), the program instructions configuring the processor to: receive video data and metadata for transmission to the sink device; encode the metadata in an auxiliary video information (AVI) information frame (InfoFrame);
  and configure the AVI InfoFrame for transmission during a frame synchronous transmission window (FSTW) of the video data, wherein the FSTW begins during a video blanking interval (VBI) of the video data, on a first video blank pixel that immediately follows a last active video pixel of a preceding video frame or video field and ends a predetermined number of video lines after a start of the VBI.

16. The non-transitory computer-readable medium of claim 15, wherein the program instructions configure the processor to: receive standard dynamic range (SDR) video data and metadata for the SDR video data;
  and encode the metadata for the SDR video data in the AVI InfoFrame.

17. The non-transitory computer-readable medium of claim 15, wherein the program instructions configure the processor to: receive, as the video data and metadata, a static high dynamic range (S-HDR) video sequence and metadata for the S-HDR video sequence;
  encode the metadata for the S-HDR video sequence in the AVI InfoFrame and in a DRange and Mastering (DRAM) InfoFrame;
  and configure the AVI InfoFrame and the DRAM InfoFrame for transmission during the FSTW.

18. The non-transitory computer-readable medium of claim 15, wherein the program instructions configure the processor to: receive, as the video data and metadata, a dynamic high dynamic range (HDR) video sequence and metadata for the dynamic HDR video sequence;
  encode the metadata for the dynamic HDR video sequence in the AVI InfoFrame and in a HDR dynamic metadata extended (HDR DME) InfoFrame;
  and configure the AVI InfoFrame and the HDR DME InfoFrame for transmission during the FSTW.

19. A non-transitory computer-readable medium including program instructions for execution by a processor to configure the processor in a sink device to receive data from a source device using a high-definition media interface (HDMI), the program instructions configuring the processor to: receive a video sequence from the source device, the video sequence including a plurality of video fields or video frames, each video field or video frame including an active video interval and a vertical blanking interval (VBI);
  extract an auxiliary video information (AVI) information frame (InfoFrame) including first metadata for the video sequence from a frame synchronous transmission window (FSTW) of the VBI of at least one of the fields or frames of the video sequence, wherein the FSTW begins during the VBI on a first video blank pixel that immediately follows a last active video pixel of a preceding video field or video frame and ends a predetermined number of video lines after a start of the VBI;
  extract the first metadata from the AVI InfoFrame; and apply the extracted first metadata to video data in the active video interval of the video field or video frame containing the FSTW.

20. The non-transitory computer-readable medium of claim 19, wherein the program instructions configure the processor to: receive, as the video sequence, a static high dynamic range (S-HDR) video sequence and the method further comprises: extract a DRange and Mastering (DRAM) InfoFrame from the FSTW of the VBI of the at least one field or frame of the video sequence; extract second metadata from the DRAM InfoFrame; and apply the second metadata to the video data in the active video interval of the video field or video frame containing the FSTW.

* * * * *